United States Patent [19]
Kitade

[11] Patent Number: 6,122,730
[45] Date of Patent: Sep. 19, 2000

[54] "TEST UNDER MASK HIGH" INSTRUCTION AND "TEST UNDER MASK LOW" INSTRUCTION EXECUTING METHOD AND APPARATUS

[75] Inventor: Masahiro Kitade, Hadano, Japan

[73] Assignees: Hitachi, Ltd., Tokyo; Hitachi Information Technology Co., Ltd., Kanagawa-ken, both of Japan

[21] Appl. No.: 09/162,443

[22] Filed: Sep. 29, 1998

[30] Foreign Application Priority Data

Oct. 2, 1997 [JP] Japan ................................. 9-269517

[51] Int. Cl.[7] .............................. G06F 9/00; G06F 9/06
[52] U.S. Cl. ........................................ 712/274; 712/226
[58] Field of Search .................................. 712/226, 224, 712/223, 234

[56] References Cited

U.S. PATENT DOCUMENTS 4,967,351 10/1990 Zmyslowski et al. ................. 712/234

OTHER PUBLICATIONS

Boggs, Jr., IBM TDB vol. 20 No. 1 pp. 106–107; Jun. 1977.
Bechdel et al., IBM TDB vol. 19 No., 1 pp. 65–66 Jun. 1976.

*Primary Examiner*—Larry D. Donaghue
*Attorney, Agent, or Firm*—Antonelli, Terry, Stout & Kraus, LLP

[57] ABSTRACT

An arithmetic method and apparatus for executing a TMH (Test under Mask High) and a TML (Test under Mask Low) instruction. This apparatus comprises a circuit for detecting that the result of an AND operation performed on a test mask and an operand is "0", which represents the condition for setting a condition code at "0", a circuit for detecting an operand bit corresponding to the leftmost bit of the test mask which is the condition for setting the condition codes at "1" and "2", a circuit for detecting that the result of an OR operation performed on an inverted test mask and the operand is all zeros, which is the condition for setting the condition code at "3", and a circuit for producing a proper condition code based on the outputs of those circuits.

5 Claims, 4 Drawing Sheets

FIG. 3

TRUTH TABLE FOR SELECTOR 106

| INPUT REGISTOR 103 ( TESTMASK PATTERN ) | | | | | | | | | | | | | | | | OUTPUT BIT POSITION FROM LEFT END OF SELECTOR 102 |
|---|---|---|---|---|---|---|---|---|---|---|---|---|---|---|---|---|
| 1 | | | | | | | | | | | | | | | | 1ST BIT |
| 0 | 1 | | | | | | | | | | | | | | | 2ND BIT |
| 0 | 0 | 1 | | | | | | | | | | | | | | 3RD BIT |
| 0 | 0 | 0 | 1 | | | | | | | | | | | | | 4TH BIT |
| 0 | 0 | 0 | 0 | 1 | | | | | | | | | | | | 5TH BIT |
| 0 | 0 | 0 | 0 | 0 | 1 | | | | | | | | | | | 6TH BIT |
| 0 | 0 | 0 | 0 | 0 | 0 | 1 | | | | | | | | | | 7TH BIT |
| 0 | 0 | 0 | 0 | 0 | 0 | 0 | 1 | | | | | | | | | 8TH BIT |
| 0 | 0 | 0 | 0 | 0 | 0 | 0 | 0 | 1 | | | | | | | | 9TH BIT |
| 0 | 0 | 0 | 0 | 0 | 0 | 0 | 0 | 0 | 1 | | | | | | | 10TH BIT |
| 0 | 0 | 0 | 0 | 0 | 0 | 0 | 0 | 0 | 0 | 1 | | | | | | 11TH BIT |
| 0 | 0 | 0 | 0 | 0 | 0 | 0 | 0 | 0 | 0 | 0 | 1 | | | | | 12TH BIT |
| 0 | 0 | 0 | 0 | 0 | 0 | 0 | 0 | 0 | 0 | 0 | 0 | 1 | | | | 13TH BIT |
| 0 | 0 | 0 | 0 | 0 | 0 | 0 | 0 | 0 | 0 | 0 | 0 | 0 | 1 | | | 14TH BIT |
| 0 | 0 | 0 | 0 | 0 | 0 | 0 | 0 | 0 | 0 | 0 | 0 | 0 | 0 | 1 | | 15TH BIT |
| 0 | 0 | 0 | 0 | 0 | 0 | 0 | 0 | 0 | 0 | 0 | 0 | 0 | 0 | 0 | 1 | 16TH BIT |

FIG. 4

TRUTH TABLE FOR CONDITION CODE GENERATOR 109

| INPUT | | | OUTPUT |
|---|---|---|---|
| AND GATE 105 OUTPUT | SELECTOR 106 OUTPUT | AND GATE 108 OUTPUT | CONDITION CODE |
| 1 | | | 0 |
| 0 | 0 | 0 | 1 |
| 0 | 1 | 0 | 2 |
| 0 | | 1 | 3 |

"TEST UNDER MASK HIGH" INSTRUCTION AND "TEST UNDER MASK LOW" INSTRUCTION EXECUTING METHOD AND APPARATUS

BACKGROUND OF THE INVENTION

The present invention relates to a method and apparatus which operate data by controlling hardware or a microprogram, and more particularly to a method and apparatus which executes a TMH (Test under Mask High) instruction and a TML (Test under Mask Low) instruction to set a condition code.

As well known in the prior art, a TM instruction consists of a one byte test mask and a one byte operand. See, for example, IBM's Enterprise Systems Architecture/390, "Principles of Operation Fourth Edition" (September 1996), Chapter 7, pages 7-73, 7-74 and A-30. The TM instruction sets a condition code at "0" when an operand selected by a test mask is all zeros or when a test mask is all zeros. When an operand selected by the test mask is a mixture of zeros and ones, the TM instruction sets the condition code at "1". When an operand selected by the test mask is all ones, the TM instruction sets the condition code at "3".

The TMH and TML instructions are known as extensions to the TM instruction. For example, see the above literature, pages 7-73 and 7-74. There are two extended points, that is, (1) the test mask and operand are respectably extended from one byte long to two bytes long, and (2) if an operand corresponding to the leftmost bit of the test mask is selected and a bit of the selected operand is zero, condition code 1 is set, and if the bit of the selected operand is one, condition code 2 is set, whereas in the case of the TM instruction when the operand selected by the test mark is a mixture of zeros and ones, condition code 1 is set.

SUMMARY OF THE INVENTION

As described above, the TMH or TML instruction uses a test mask which is a constant of two bytes given by the TMH or TML instruction. In addition, the TMH instruction uses as an operand the most significant two bytes of a 4-byte general register specified the TMH instruction whereas the TML instruction uses as an operand the least significant two bytes of the specified general register. Those instructions each select a bit of the 2-byte operand corresponding to a bit "1" of the test mask and sets a condition code depending on the status of the selected bit.

It is an object of the present invention to provide a method and apparatus for realizing high-speed execution of a TMH and a TML instruction.

In order to achieve the above object, according to one aspect of the present invention, an arithmetic apparatus comprises a dedicated arithmetic unit for a test mask and an operand for a TMH and a TML instruction which rapidly completes a required operation in one step and sets a corresponding condition code. In more detail, in obtaining a condition code for each of the TMH and TML instructions, the arithmetic unit comprises a first circuit for detecting that the result of ANDing the test mask and operand is "0", which is the condition for setting the condition code at "0"; a second circuit for detecting an operand bit corresponding to a leftmost bit of the test mask, which is the condition for setting the condition code at "1" or "2"; a third circuit for detecting that the result of ORing an inverse of the test mask and the operand is all ones, which is the condition for setting the condition code at 3; and a fourth circuit for producing a proper condition code by combining the results of the detection by said first, second and third circuits.

Another object of the present invention is to provide an arithmetic method of executing a TMH and a TML instruction by using a general arithmetic unit and a microprogram. According to another aspect of the present invention, this method comprises the steps of:

ANDing the test mask included in an input TMH or TML instruction and an operand specified by the input instruction and setting a condition code at "0" when the result of ANDing indicates all "0";

when the result of the ANDing is not all "0", ORing an inverted test mask and the operand, and setting the condition code at 3 when the result of the ORing indicates all bits of "1";

when the result of the ANDing is not all "0" and the result of the ORing is not all "1", obtaining a normalized count representing the position of a leftmost bit "1" of the test mask by the number of bits from the leftmost position of the test mask and setting the condition code at "1" when the leftmost bit of the bit-left-shifted operand by the normalized count is "0"; and setting the condition code at "2" when the leftmost bit of the bit-left-shifted operand is "1".

BRIEF DESCRIPTION OF THE DRAWINGS

FIG. 3 shows a truth table which selects an operand bit corresponding to the leftmost bit "1" of a test mask;

FIG. 4 shows a truth table which produces condition codes of TMH and TML instructions from the result of the operation of the arithmetic apparatus of FIG. 2.

DESCRIPTION OF THE PREFERRED EMBODIMENTS

A TMH and a TML instruction will be described before commencement of the description of the preferred embodiments.

Figure 1A:
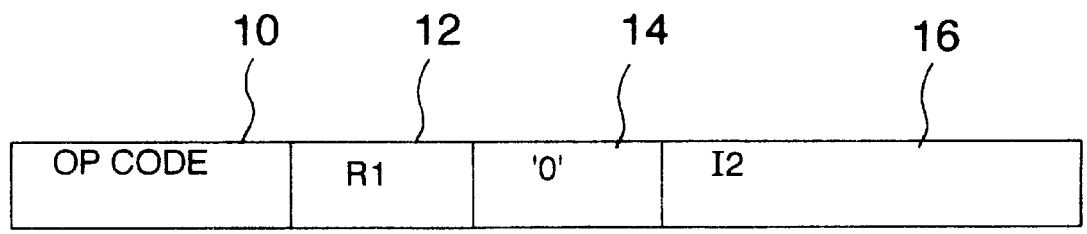
FIGS. 1A and 1B show formats of a TMH and a TML instruction, respectively.
Figure 1B:
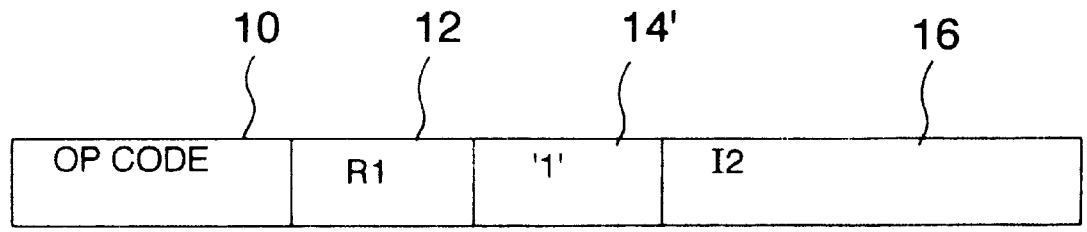

FIGS. 1A and 1B show formats of the TMH and TML instructions, respectively. In FIG. 1A, reference numeral 10 denotes an OP code field; 12 a 4-bit R1 field which specifies a 4-byte general register; 14 a field in which four consecutive bits "0" are stored; and 16 a field for a 2-byte test mask. The fields 10 and 14 each indicate that the instruction of interest is a TMH one.

In FIG. 1B, reference numeral 14' shows a field in which four bits of "0001" are stored, and fields 10 and 14' each indicate that the appropriate instruction is a TML one as in FIG. 1A. Other fields are similar to corresponding ones of FIG. 1A, so that further description thereof will be omitted.

The preferred embodiments of the present invention will now be described with reference to the accompanying drawings.

Figure 2:
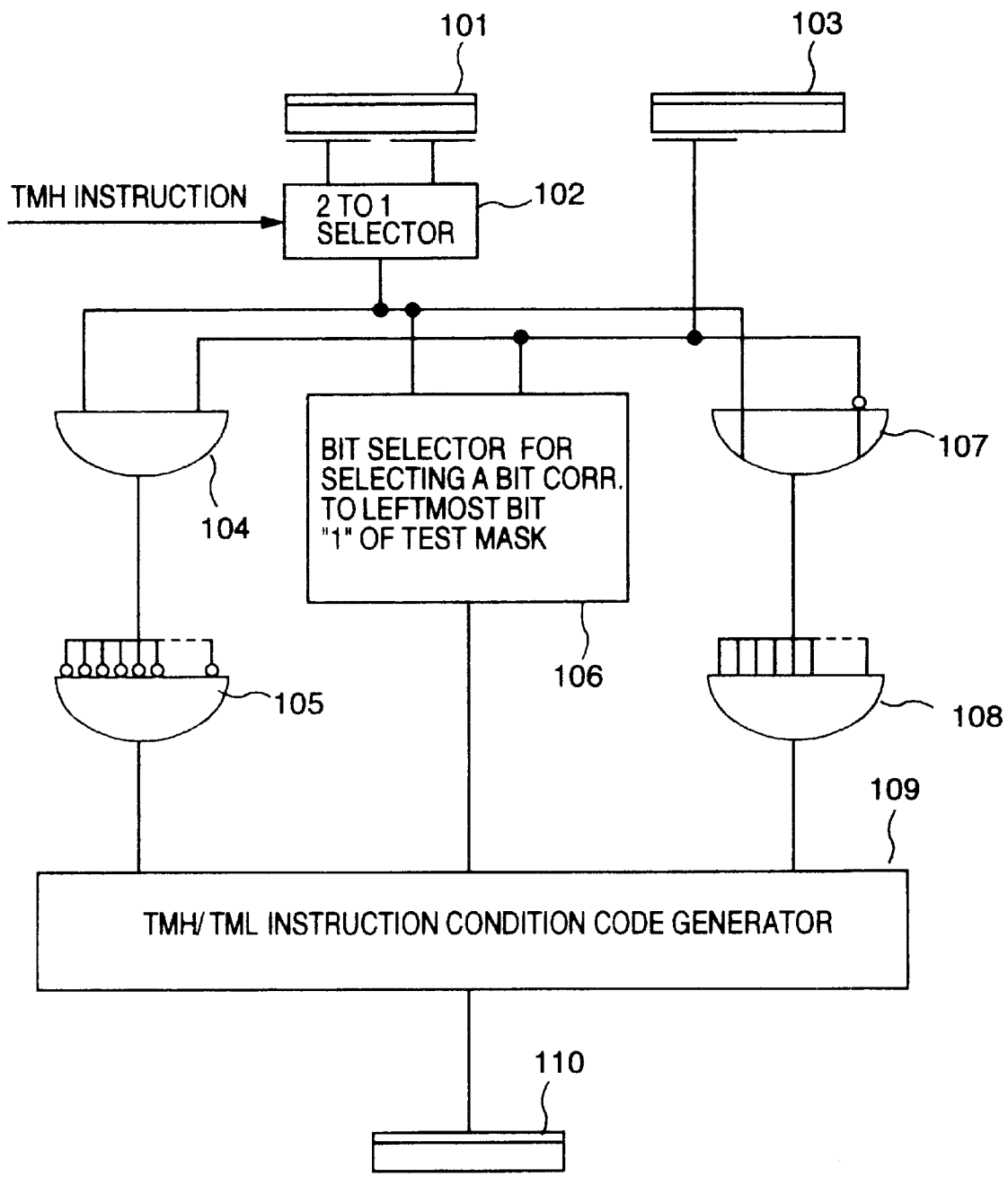
FIG. 2 is a block diagram of an arithmetic apparatus indicative of one embodiment of the present invention.

FIG. 2 is a block diagram of an arithmetic apparatus as one embodiment of the present invention which operates in accordance with the obtained TMH and TML instructions. In FIG. 2, reference numeral 101 denotes a work register in which a 4-byte general register is set; 102 a selector which selects the first or second half (two bytes) of the register 101 in accordance with an execution instruction; 103 a work register in which a 2-byte test mask is left justified; 104 a 2-byte-wide 2-input AND gate for the test mask and the operand outputted by the selector 102; 105 a 16-input AND gate which detects that 2-byte data of the AND gate 104 output are all zeros; 106 an operand bit selector which selects a bit of the operand corresponding to the leftmost bit "1" of the test mask; 107 a 2-byte wide 2-input OR gate for an inverted test mask and an operand output from the selector 102; 108 a 16-input AND gate for detecting that 2-byte data output from the AND gate 107 is all ones; 109 a circuit which produces a condition code based on the outputs from the AND gate 105, selector 106, and AND gate 108; and 110 a condition code register which stores the condition code.

The TMH instruction specifies the first half (2 bytes) of the 4-byte general register as an operand to be tested whereas the TML instruction specifies the second half (2 bytes) of the register as an operand to be tested. Thus, the selector 102 obtains an required operand from the general register in accordance with an execution instruction. As described above, the AND gate 104 is of the 2 bytes-wide type for the output of the selector 102 and the register 103 as the test mask. The AND gate 104 outputs operand data corresponding to "1" bit positions of the test mask with bits of the operand corresponding to "0" bit positions of the test mask being made "0". The 16-input AND gate 105 receives inverted data from the AND gate 104 and detects either a state where the operand data selected by the test mask is all zeros or a state where the test mask is all zeros.

As described above, the OR gate 107 is of the 2-byte wide 2-input type for receiving the selector 102 output and an inverted output of the register 103, and outputs operand data corresponding to bit "1" positions of the test mask with bits of the operand that correspond to bit "0" positions of the test mask being made "1". The 16-input AND gate 108 which receives output data from the OR gate 107 detects a state in which the operand data selected by the test mask is all ones or a state in which the test mask is all zeros As described above, the selector 106 selects a bit of an operand corresponding to the leftmost bit "1" of a test mask. Its truth table is shown in FIG. 3 in which bit positions from the respective left ends of the register 103 and selector 102 arranged horizontally in any line indicate AND conditions. If a test mask held by the register 103 is, for example, "2E00", the register 103 in the third line of the FIG. 3 table corresponds to "001" and AND operation is performed on the third bit of the data "001" in the register 103 and the third bit from the leftmost bit of the selector 102 output. If both the third bits are "1", thereby satisfying ANDing, the selector 106 outputs "1".

The outputs from the AND gate 105, selector 106 and AND gate 108 are ANDed to produce a condition code, a truth table for which is shown in FIG. 4. In FIG. 4, each of blanks free from the input items may take any value. For example, when the outputs from the AND gate 105, selector 106 and AND gate 108 are 0, 1, 0, respectively, which corresponds to a third line in the table of FIG. 4, a condition code "2" is output from a condition code generator 109 and stored in a register 110 to thereby complete the operation.

The time required for performing logic operations involving the registers 101 and 103 through the register 110 is satisfactorily short compared to a general arithmetic unit such as an adder because the number of logical stages is small, so that the condition code is produced in one step within one machine cycle.

Figure 5:
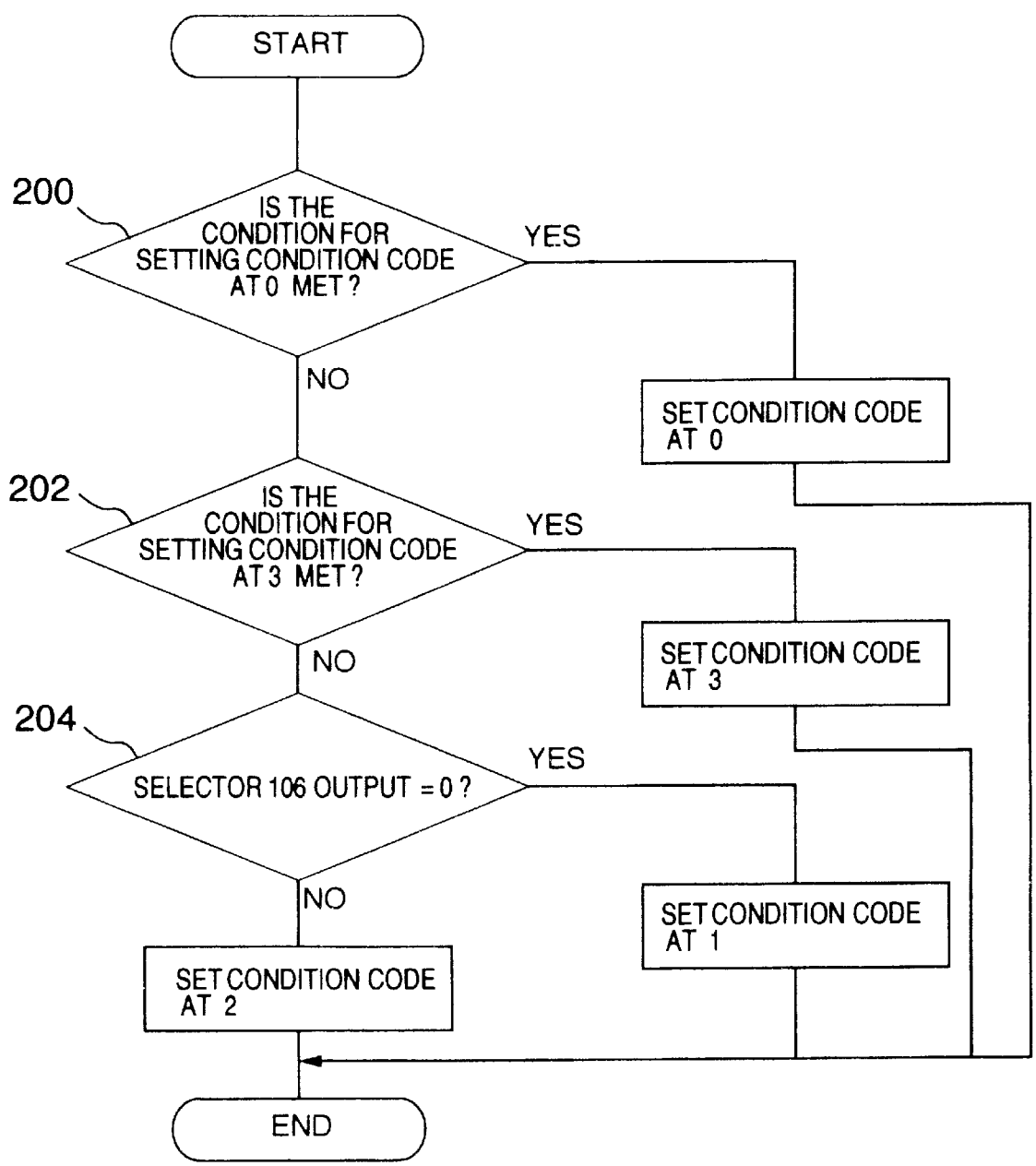
FIG. 5 is a flow chart of a process for executing the TMH and TML instructions.

Another embodiment in which a TMH and a TML instruction operating is performed, using a general arithmetic unit and a microprogram, will be described with reference to a flow chart of FIG. 5.

A state where the operand selected by a test mask is all zeros or the test mask is all zeros, which is the conditions for setting the condition code at 0, can be detected in one step where the test mask and operand are ANDed to thereby provide a result which is all zeros (step 200).

A state where the operand selected by the test mask is all ones, which is the conditions for setting the condition code at 3, is detected in two steps in which
(1) the test mask and operand are ANDed to thereby provide a result which is not all zeros (step 200), and
(2) an inverted test mask and the operand are ANDed to thereby produce a result which is all ones (step 202).

A state in which the operand selected by the test mask is a mixture of zeros and ones and that its selected leftmost bit is "0", which is the conditions for setting the condition code at "1", is detected in three steps in which (1) the test mask and the operand are ANDed to thereby provide a non-all-zero result (step 200), (2) an inverse of the test mask and the operand are ORed to provide a result which is not all bits of "1" (step 202), and (3) the operand is bit-left-shifted by a normalized count, which represents the position of the leftmost bit "1" of the test mask with the number of bits from the position of the leftmost bit, to thereby provide a resulting leftmost bit of "0" (step 204).

A state in which the operand selected by a test mask is a mixture of zeros and ones and the selected leftmost bit is one, which is the condition for setting the condition code at 2, is detected in three steps in which (1) the test mask and the operand are ANDed to thereby provide a result which is not all zeros (step 200), (2) an inverted test mask and the operand are ORed to thereby provide a result which is not all bits of "1" (step 202), and (3) the operand is bit shifted leftward by a normalized count, which represents the position of the leftmost bit position "1" of the test mask with the number of bits from the position of the leftmost bit, to thereby provide a resulting leftmost bit of "1" (step 204).

According to the present embodiment, the condition codes of the TMH and TML instructions are produced, using a general arithmetic unit and a micro-program. According to the first-mentioned embodiment, provision of the dedicated arithmetic unit serves to reduce the number of operating cycles to thereby perform in one step operations involving the register in which an operand is set through the condition code register.

What is claimed is:

1. An arithmetic apparatus for executing a TMH (Test under Mask High) and a TML (Test under Mask Low) instruction, the TMH and TML instructions each comprising a field in which a 2-byte constant used as a test mask is stored, a field in which information specifying a 4-byte general register is stored, a field in which information discriminating between the TMH and TML instructions is stored, the TMH instruction specifying as an operand the most significant 2 bytes of the specified 4-byte general register, the TML instruction specifying as an operand the least significant two bytes of the specified general register, the arithmetic apparatus selecting every bit of the 2-byte operand specified by the input TMH or TML instruction that corresponds to a bit "1" of the test mask, and setting a condition code depending on the state of the selected bit, said arithmetic apparatus comprising:

a first circuit for detecting that a result of ANDing the test mask included in the input instruction and an operand specified by the input instruction indicates all "0"'s which is a necessary condition for setting the condition code at "0";

a second circuit for detecting an operand bit corresponding to a leftmost bit which is "1" of the test mask, a necessary condition for setting the condition code at "1" or "2" being that the operand bit is "0" or "1";

a third circuit for detecting that a result of ORing an inverse of the test mask and the specified operand is all "1"'s, which is a necessary condition for setting the condition code at "3"; and a fourth circuit for producing the condition code by combining the results of the detection by said first, second and third circuits.

2. The arithmetic apparatus according to claim 1, wherein said fourth circuit sets the condition code at "0" when said first circuit detects all "0", sets the condition code at "3" when the first circuit detects at least one "1" and the third circuit detects all "1"'s, and sets the condition code at "1" or "2" depending on whether an operand bit value detected by said second circuit is "0" or "1" when said first circuit detects at least one "1" and the result of the detection by said third circuit includes "0".

3. An arithmetic method of executing a TMH (Test under Mask High) and a TML (Test under Mask Low) instruction, the TMH and TML instructions each comprising a field in which a 2-byte constant used as a test mask is stored, a field in which information specifying a 4-byte general register is stored, a field in which information discriminating between the TMH and TML instructions is stored, the TMH instruction specifying as an operand the most significant 2 bytes of the specified 4-byte general register, the TML instruction specifying as an operand the least significant two bytes of the specified general register, the method selecting every bit of the 2-byte operand specified by the input TMH or TML instruction and corresponding to a bit "1" of the test mask, and setting a condition code depending on the state of the selected bit, said method comprising the steps of:

ANDing the test mask included in the input instruction and the operand specified by the input instruction and setting the condition code at "0" when the result of the AND operation indicates all bits of "0";

when the result of the ANDing is not all "0", inverting the test mask and ORing the inverted test mask and the operand, and setting the condition code at "3" when the result of the ORing indicates all bits of "1";

when the result of the ANDing is not all bits of "0" and the result of the ORing is not all bits of "1", obtaining a normalized count representing the position of a leftmost bit "1" of the test mask by the number of bits from the leftmost position of the test mask and setting the condition code at "1" when the leftmost bit of the operand bit-left-shifted by the normalized count is "0"; and setting the condition code at "2" when the leftmost bit of the bit-left-shifted operand is "1".

4. An arithmetic apparatus for executing a TMH (Test under Mask High) and a TML (Test under Mask Low) instruction, the TMH and TML instructions each comprising a field in which a 2-byte constant used as a test mask is stored, a field in which information specifying a 4-byte general register is stored, a field in which information discriminating between the TMH and TML instructions is stored, the TMH instruction specifying as an operand the most significant 2 bytes of the specified 4-byte general register, the TML instruction specifying as an operand the least significant two bytes of the specified general register, the arithmetic apparatus selecting every bit of the 2-byte operand specified by the input TMH or TML instruction that corresponds to a bit "1" of the test mask, and setting a condition code depending on the state of the selected bits, said arithmetic apparatus comprising:

a first circuit for detecting a necessary condition for setting the condition code at "0" by detecting that a result of ANDing the test mask included in the input instruction and an operand specified by the input instruction is all bits "0";

a second circuit for detecting an operand bit corresponding to a leftmost bit which is "1" of the test mask to detect a necessary condition for setting the condition code at "1" or "2";

a third circuit for detecting a necessary condition for setting the condition code "3" by detecting that the result of ORing an inverse of the test mask and the specified operand is all bits of "1"; and a fourth circuit for producing the condition code by combining the results of the detection by said first, second and third circuits.

5. The arithmetic apparatus according to claim 4, wherein said fourth circuit sets the condition code at "0" when said first circuit outputs "1", sets the condition code at "3" when the first circuit outputs "0" and the third circuit outputs "1", and sets the condition code at "1" or "2" depending on whether an operand bit value detected by said second circuit is "0" or "1" when said first circuit outputs "0" and the result of the detection by said third circuit is "0".

* * * * *